(12) United States Patent
Voss

(10) Patent No.: US 6,815,674 B1
(45) Date of Patent: Nov. 9, 2004

(54) MASS SPECTROMETER AND RELATED IONIZER AND METHODS

(75) Inventor: Guenter F. Voss, Much (DE)

(73) Assignee: Monitor Instruments Company, LLC, Cheswick, PA (US)

( * ) Notice: Subject to any disclaimer, the term of this patent is extended or adjusted under 35 U.S.C. 154(b) by 0 days.

(21) Appl. No.: 10/453,758

(22) Filed: Jun. 3, 2003

(51) Int. Cl.[7] .................. H01J 49/00; H01J 49/38; B01D 59/44

(52) U.S. Cl. .................. 250/296; 250/290; 250/291; 250/292; 250/293; 250/294; 250/297; 250/427

(58) Field of Search .................. 250/281–283, 250/290–292, 294, 427, 296–299, 423 R, 424

(56) References Cited

U.S. PATENT DOCUMENTS

| | | | |
|---|---|---|---|
| 2,780,729 A | * | 2/1957 | Robinson et al. ............ 250/297 |
| 2,844,726 A | * | 7/1958 | Robinson .................... 250/297 |
| 2,882,410 A | | 4/1959 | Brobeck |
| 3,010,017 A | * | 11/1961 | Brubaker et al. ........... 250/297 |
| 3,070,951 A | | 1/1963 | Hetzel |
| 3,437,805 A | * | 4/1969 | Brown ....................... 250/297 |
| 3,497,688 A | * | 2/1970 | Brown et al. ................ 250/290 |
| 3,590,243 A | | 6/1971 | Perrin et al. |
| 4,298,795 A | | 11/1981 | Takeuchi et al. |
| 4,649,279 A | * | 3/1987 | Delmore .................... 250/427 |
| 4,859,908 A | * | 8/1989 | Yoshida et al. ......... 315/111.81 |
| 4,882,485 A | | 11/1989 | Duryea |
| 4,952,802 A | | 8/1990 | Duryea |
| 4,959,543 A | * | 9/1990 | McIver et al. ............ 250/291 |
| 5,155,357 A | * | 10/1992 | Hemond .................... 250/291 |
| 5,304,799 A | * | 4/1994 | Kurzweg .................... 250/296 |
| 5,340,983 A | * | 8/1994 | Deinzer et al. ............. 250/281 |
| 6,501,074 B1 | * | 12/2002 | Gentry et al. .............. 250/296 |
| 6,590,206 B1 | * | 7/2003 | Evrard ...................... 250/293 |
| 6,617,576 B1 | * | 9/2003 | Voss et al. .................. 250/290 |
| 6,624,410 B1 | * | 9/2003 | Voss .......................... 250/291 |
| 2003/0015658 A1 | * | 1/2003 | Felter ........................ 250/292 |

* cited by examiner

Primary Examiner—John R. Lee
Assistant Examiner—Bernard E. Souw
(74) Attorney, Agent, or Firm—Arnold B. Silverman; Philip E. Levy; Eckert Seamans Cherin & Mellott, LLC

(57) ABSTRACT

In one embodiment, a miniaturized structure and associated method function as a mass spectrometer or analyzer and may, with modification, function as an ion generator. The miniaturized structure has a pair of generally planar parallel spaced electrodes which have projecting walls cooperating to define an ion generating chamber and an exit aperture. By controlling the electric field which is oriented perpendicular to an applied magnetic field, the ion beam may be separated into a plurality beams based upon mass to charge ratio with a predetermined mass to charge ratio emerging from the exit of the apparatus and when the apparatus is functioning as a mass spectrometer or analyzer impinges on an ion collector which responsively transmits information to a cooperating processor. Where it is desired to have it function as an ionizer the ion collector disposed adjacent the ion exit is eliminated.

36 Claims, 23 Drawing Sheets

MASS SPECTROMETER AND RELATED IONIZER AND METHODS

BACKGROUND OF THE INVENTION

1. Field of the Invention

This invention relates to so called crossed field mass spectrometric analyzers and ionizers which separate ionized gas particles according to their mass to charge ratio by motion in an electric field and a magnetic field perpendicular to each other.

2. Description of the Prior Art

The use of mass spectrometers in determining the identity and quantity of constituent materials in a gaseous, liquid or solid specimen has long been known. It has been known, in connection with such systems, to analyze the specimen under vacuum through conversion of the molecules or atoms into an ionic form, separating the ions by mass to charge ratio, and permitting the ions to bombard a detector. See, generally, U.S. Pat. Nos. 2,882,410; 3,070,951; 3,590,243; and 4,298,795. See, also, U.S. Pat. Nos. 4,882,485 and 4,952,802.

In general, mass spectrometers contain an ionizer inlet assembly wherein the specimen to be analyzed is received, a high vacuum chamber which cooperates with the ionizer inlet, an analyzer assembly which is disposed within the high vacuum chamber and is adapted to receive ions from the ionizer. Detector means are employed in making a determination as to the constituent components of the specimen employing mass to charge ratio as a distinguishing characteristic. By one of many known means, the molecules or atoms of the gaseous specimen contained in the ionizer are converted into ions, which are analyzed by such equipment.

It has been known with prior art cycloidal mass spectrometers to use a fixed collector and ramped electric field in looking at only one mass to charge ratio at a time. In many prior art mass spectrometer systems, regardless of whether they were of the cycloidal type or not, the ionizers were quite large and, as a result, dominated the design and specifications of the systems to be employed therewith.

U.S. Pat. No. 5,304,799 discloses a cycloidal mass spectrometer having a housing defining an ion trajectory volume, an electric field generator for establishing an electric field within the ion trajectory volume and an ionizer for receiving gaseous specimens to be analyzed and converting the same into ions, which travel through orthogonal electric and magnetic fields and subsequently impinge on a collector. This spectrometer was designed to have a plurality of different ions' mass to charge ratios impinging on the collector depending on the strength of the fields. It was stated that the cycloidal mass spectrometer and ionizer may be miniaturized to as provide a small, readily portable instrument.

It has been known to employ crossed fields mass spectrometry in two types of analytical problems. It has been employed in the identification of molecules with high molecular weight. It has also been employed in precise measurement of the relative abundance of isotopes.

It has also been known to employ mass spectrometers in connection with situations involving low mass to charge ratio such as in helium leak detectors and hydrogen analyzers. Mass spectrometry has been employed in such situations as it is nearly free of interference within the mass range and because of its sensitivity. The analyzers typically employed in helium leak detectors, for example, are generally smaller copies of larger analyzers such as sector field mass spectrometers which are easier to manufacture but provide a lower performance level and tend to be relatively expensive.

Quadrupole analyzers are small and less expensive than magnetic separators, but their filter quality decreases when approaching the lower end of the mass scale. The so-called "zero blast" represents the contribution of the particles the quadrupole is not tuned on as a result of the weak filter characteristics. For a helium leak detector, for example, the zero blast portion of hydrogen interferes with the helium signal at about 4 amu.

The present invention focuses on field structures of a cycloidal mass spectrometer wherein a circular motion is imposed by a linear motion.

SUMMARY OF THE INVENTION

In one embodiment of the invention which may function as a mass spectrometer or analyzer, first and second planar, generally parallel electrodes which generate an electrical field therebetween and have projecting walls which cooperate with the base of the general planar electrodes to define an ion generating chamber. Electric fields generated by the electrodes are oriented perpendicular with respect to a magnetic field which may be generated by permanent magnets or electromagnets in a manner well known to those skilled in the art. Certain ion beams based upon mass to charge ratio exit through an ion exit with the other separated ion beams being separated on the mass to charge basis being retained within the ion generating chamber. An ion collector operatively associated with the ion exit is positioned adjacent thereto and may cooperate with processing means well known to those skilled in the art in determining the identity of the molecule or atom. Employing the same apparatus without the ion collector can result in the device functioning as a mass selective ion generator. Related methods are also disclosed.

The apparatus and method of this embodiment are particularly structured to be employed with low mass materials which may be 20 amu or less.

It is an object of the present invention to provide a mass spectrometer which is particularly suited to the special requirements of the low mass range.

It is a further object of the present invention to provide such a mass spectrometer wherein the electric field while not necessarily uniform serves to separate the trajectories of ions of different mass number at the low end of the mass scale, rather than providing high resolving power at the upper end of the mass scale.

It is a further object of the present invention to provide such a mass spectrometer wherein the real focusing properties can be replaced by approximation achieved by designing special field profiles in three spatial dimensions.

It is yet another object of the invention to provide such a mass spectrometer wherein the electrodes would be of small dimension, of simple structure and inexpensive to manufacture.

It is yet another object of the invention to provide an analyzer or ionizer which will be robust against imperfections in the magnetic field without materially interfering with the desired results and thereby allowing the use of small, inexpensive magnets.

These and other objects of the invention will be more fully understood from the following detailed description of the invention on reference to the illustrations appended hereto.

DESCRIPTION OF THE PREFERRED EMBODIMENTS

Figure 1:
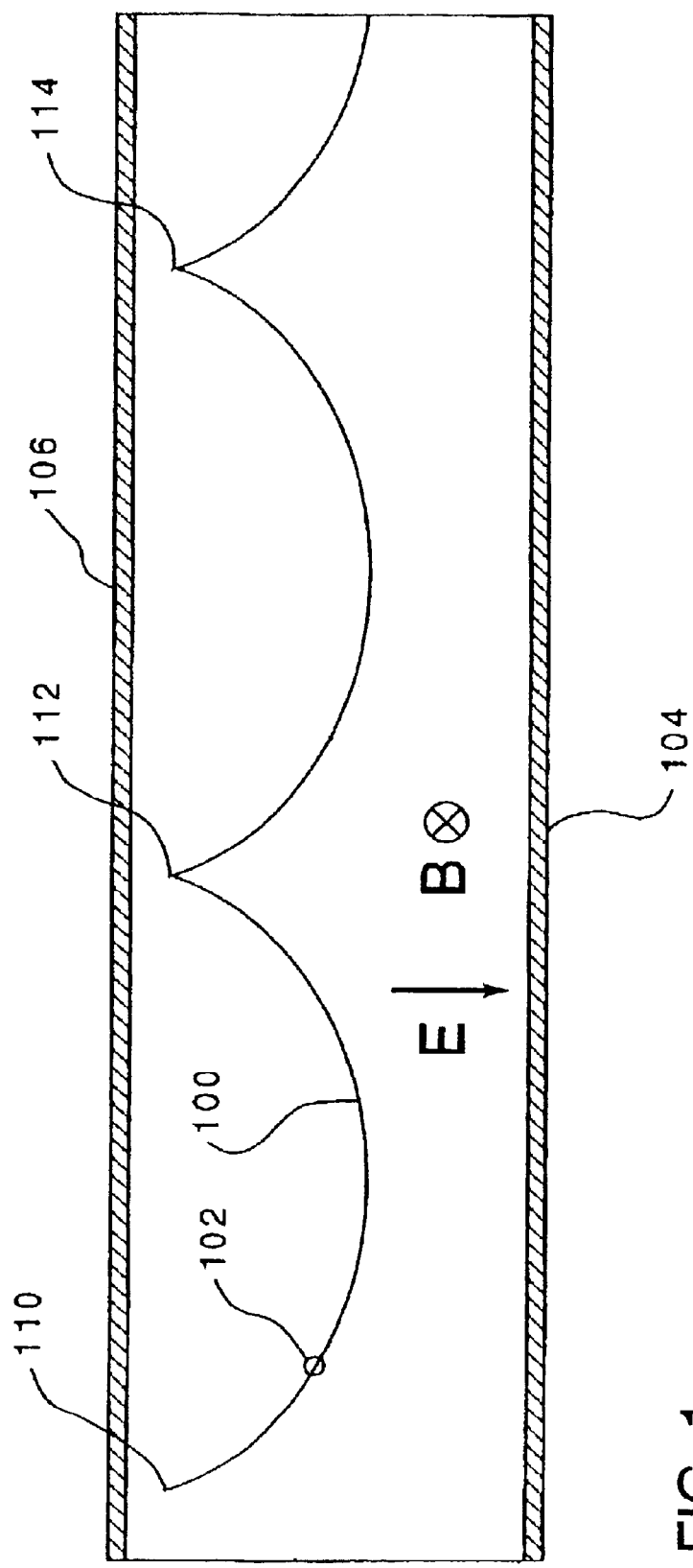
FIG. 1 is a representation of the trajectory of a positively charged particle in an electric field perpendicular to a magnetic field.

In traditional mass spectrometer, emphasis is frequently placed on features such as focusing, the use of "perfect" electric and magnetic fields and the linear relationship between the mass to charge ratio and the extent of separation, e.g., length or angle. An advantageous feature of the additional embodiments is that useful and reliable information can be obtained without requiring the ultimate in these hereinbefore described characteristics particularly with respect to molecules having a low mass which is generally on the order of less than 20 amu such as hydrogen and helium or double ionized nitrogen, for example.

The development of crossed-fields mass spectrometry was mainly driven by two types of analytical problems, i.e., identification of molecules with high molecular weight and precise measurement of the relative abundance of isotopes. While both of these problems come from different applications, in terms of physics they may be considered to be equivalent. To solve these problems required instruments with high resolution which can be designed properly if the equations of motion can be established and the ion trajectories are predictable. As mathematical difficulties were anticipated with arbitrary fields, the development started with clearly defined boundary conditions such as uniform electric and magnetic fields, which were preferably with perfectly straight field lines. Magnets and the devices to create the electric field were the most costly components in many mass spectrometers. With increasing demands in precision, cost, weight and dimensions were increased as well.

Among the other areas where mass spectrometers have established usefulness are where only low mass to charge ratios were involved. Examples of such usage are the helium leak detector and hydrogen analyzers. An advantage of mass spectrometry in this context is its being nearly free of interference in this mass range and because of its sensitivity. The analyzers used in helium leak detectors, for example, are mostly smaller copies of larger analyzers, e.g., sector field mass spectrometers which are easier to manufacture, but show a lower performance. Nevertheless, these analyzers are relatively expensive.

Quadrupole analyzers are small and less expensive than magnetic separators, but their filter quality decreases on approaching the lower end of the mass scale. The so-called zero blast represents the contribution of particles that the quadrupole is not tuned on as a result of weak filter characteristics. For a helium leak detector this does mean that the zero blast portion of the hydrogen from the one, two and three atomic mass units interferes with the helium signal at four atomic mass units The analytical technique of mass spectrometry generates mass spectra regardless of the sample-introduction technique, the method of ion formation, or the way ions are separated. When a molecule is ionized, a characteristic ion, representing the intact molecule and/or a group of ions of different masses that represent fragments of the ionized molecule, is formed. When these ions are separated, the plot of their relative abundance versus the mass to charge ratio (m/z) of each ion constitutes a mass spectrum. Learning to identify a molecule from its mass spectrum is much easier than using any other type of spectral information. The mass spectrum shows the mass of the molecule and the masses of its pieces. Mass spectrometry offers more information about an analyte from less sample than any other technique. Mass spectrometry is also the most accurate technique for the determination of mass. The only disadvantage of mass spectrometry compared to other techniques is that, usually, the sample is consumed; however, so little sample is required, it is inconsequential.

FIG. 1 shows the trajectory 100 of a positively charged particle 102 in a uniform electric field E created by the generally parallel electrodes 104,106, while a uniform magnetic Field B is acting perpendicular to the electric field in a direction into the page. The magnetic field can be created by permanent magnets or electromagnets. In FIG. 1 and all following figures the magnet parts which will be well known to those skilled in the art are not shown. Instead of this the direction of B is marked by a symbol. According to the symbol the magnetic north pole is always above the drawing plane, while the south pole is located beneath it. If the particle starting at the starting point 110 does not have initial energy, the trajectory is a cycloid. The electrodes 104, 106 are assumed to form a perfect capacitor to create a homogeneous field. This is related to the electrode area 104, 106 and relatively large spacing therebetween.

This principle is used in cycloidal mass spectrometers, which are double focusing instruments. See generally U.S. Pat. No. 2,882,410; 3,070,951; 3,590,243; and 4,298,795. An analyzer is said to be double focusing, if locations like 112 and 114, where the starting point's conditions are reproduced periodically, do not depend on the starting energy, nor the starting angle of the particle. In FIG. 1 and all following discussions the starting energy to be zero if not expressed differently.

Figure 2:
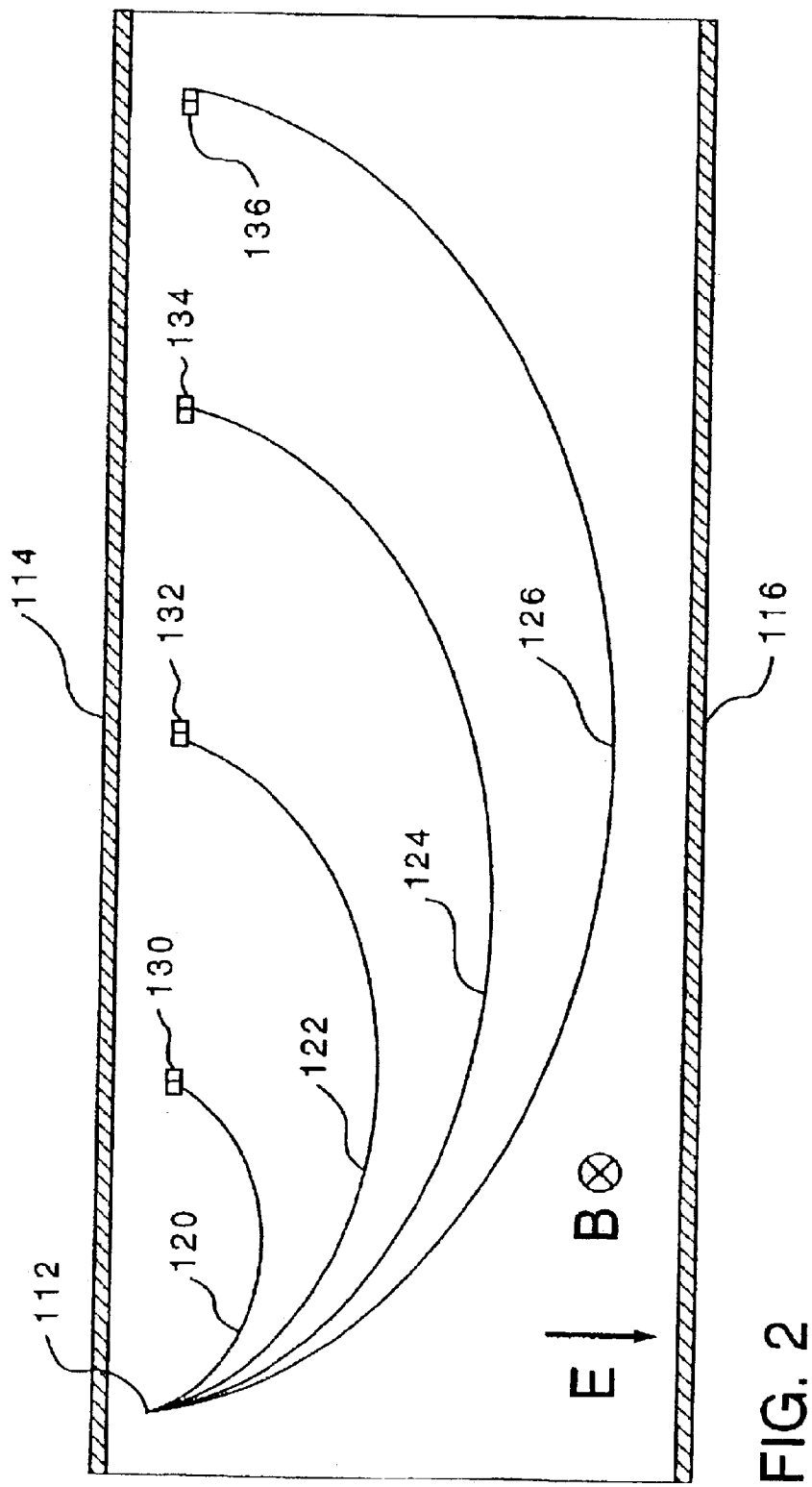
FIG. 2 shows representations of the trajectory of four ions having different mass to charge ratios.

FIG. 2 shows four trajectories 120, 122, 124, 126, flown by ions with mass to charge ratios of 1, 2, 3, and 4, respectively, starting at the starting point 112 between electrodes 114, 116 is assumed. The pitch of one cycloid, which is the distance between two points that are reproduced periodically, is proportional to the mass to charge ratio, m/z. Thus the pitch of an ion with m/z=4 equals four times the pitch of an ion with m/z=1. This is the physical separation effect in cycloidal mass analyzers. In FIG. 2 the ions impinge, respectively, after one cycloid on the collectors 130, 132, 134, 136, where they are discharged. The resulting current into the collector is the measure for the number of ions hitting the collector per time unit.

Figure 3:
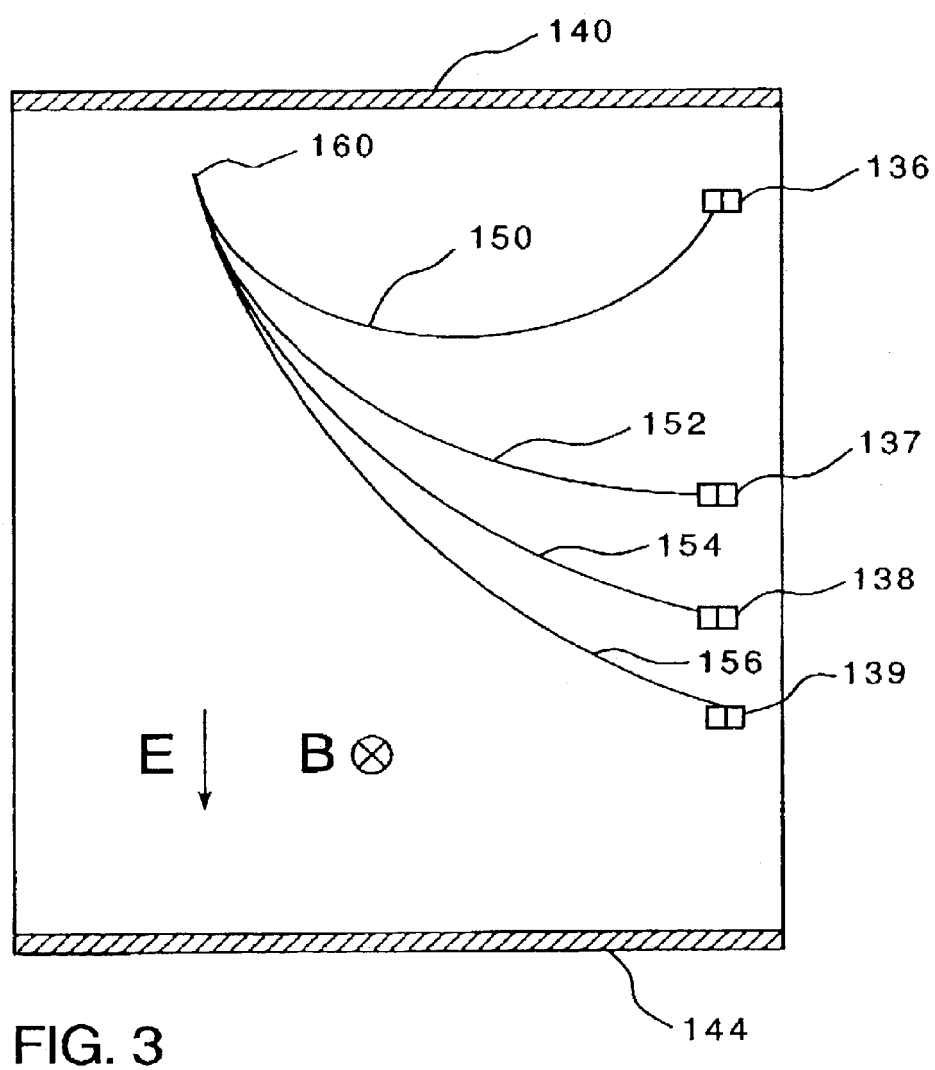
FIG. 3 shows the trajectory of ions of different mass to charge ratios and associated collectors at positions before complete cycloids are flown by the ions.

The separation of ions with different m/z ratios does not require flying a complete cycloid which is what is necessary to achieve the double focusing properties. In FIG. 2 the separation starts right with the start of the motion. In FIG. 3 the collectors 136, 137, 138 and 139 are positioned between electrodes 140, 144 as to trajectories 150, 152, 154 and 156 in a way that does not allow full cycloids for the ions with m/z=2, m/z=3, and m/z=4. The particles fly inside a perfect capacitor with a uniform electric field. The obvious advantage of the arrangement in FIG. 3 is the shrunken size of the analyzer. A negative is the loss in resolution because of the short trajectory, and a widened ion beam because the collectors 137, 138 and 139 are outside the focus. If ions of the same m/z ratio start with different energies and different angles they hit the collector plane at different positions. This effect is demonstrated in FIG. 4 wherein 10 ions have m/z=4 but different starting energies at the starling point 170 fly on different trajectories that result in a widening ion beam which hits the collector 188 only partially. As a result there would be an additional loss in resolving power and a decrease in sensitivity.

Figure 4:
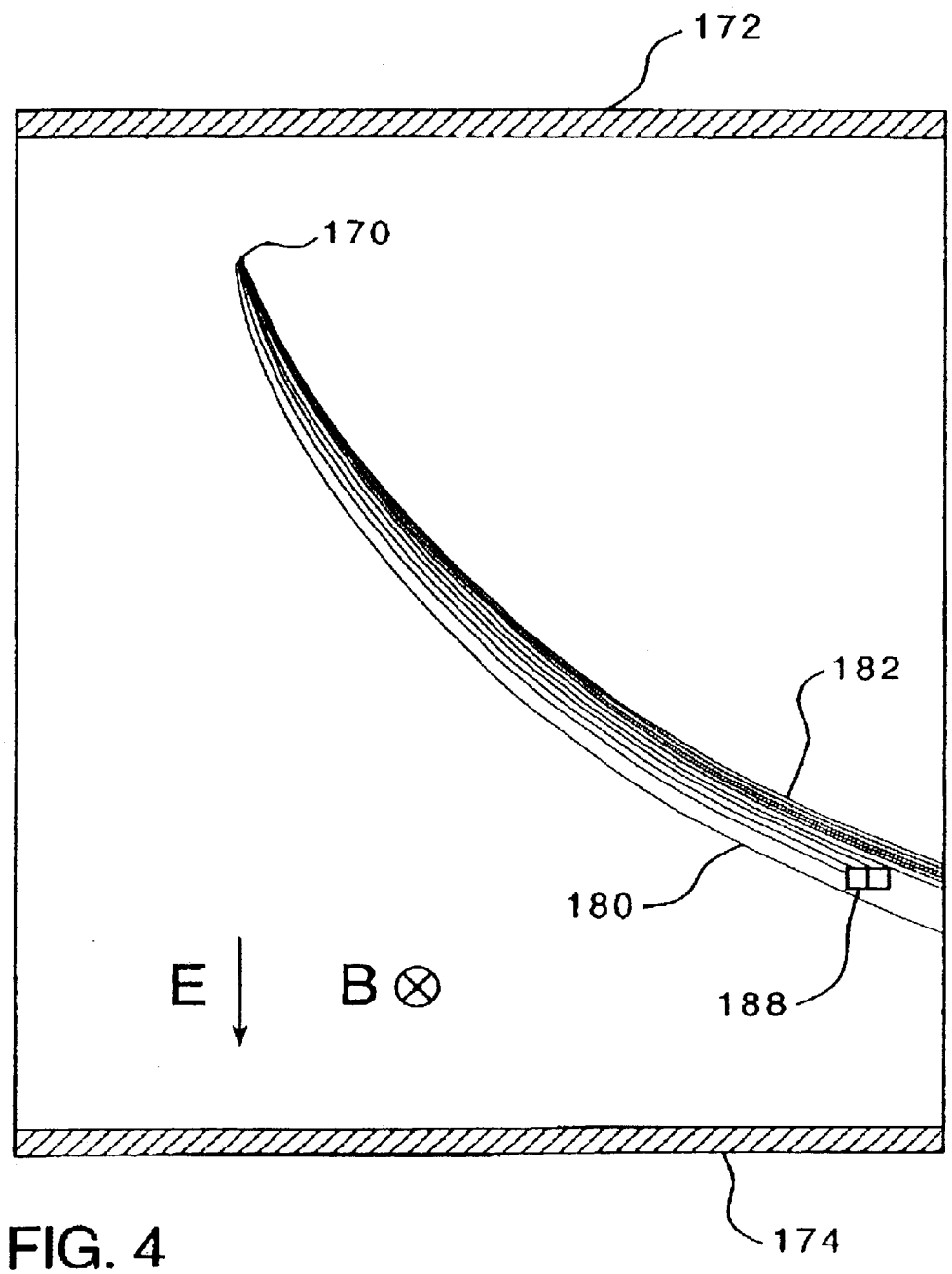
FIG. 4 shows ions with different starting velocities and their trajectories as related to an adjacent pair of electrodes.

In FIG. 4 the ions with higher starting velocity at point 170 between generally parallel electrodes 172, 174 in direction of the motion are more deflected to the outer side of the cycloid, 180, correspondingly ions with lower or negative starting velocity fly trajectories closer to the inside 182. Intuitively it can be seen that an electric field, which varies in an appropriate way should compensate the deflection of the ions depending on their starting energy. Qualitatively it is evident that the field has to become stronger in areas where the ions with higher starting energy fly. Then this field will focus the ions regardless of their starting energy on the collector 188 or as hereinafter described, on a collector slit.

FIGS. 1 through 4 were produced by the ion flight simulation program SIMION 3D V6.0 from the Idaho National Engineering Laboratory and the Lockheed Idaho Technology Company. Uniform electric fields can be simulated easily when the edges of the electrodes defined extend to the boundaries of the three-dimensional working space. Then the program assumes the extension of the electrodes as infinite. SIMION was used then to find electrode structures to generate fields, that can approximate the ideal focusing field for a fragment of a cycloidal trajectory.

The simplest structure found is a "non-perfect" capacitor consisting of two parallel plates. "Non-perfect" means that the gap between the electrodes is large compared to their area. Those capacitors produce fringing fields which leads to increasing field strength near the edges of the electrodes.

Figure 5:
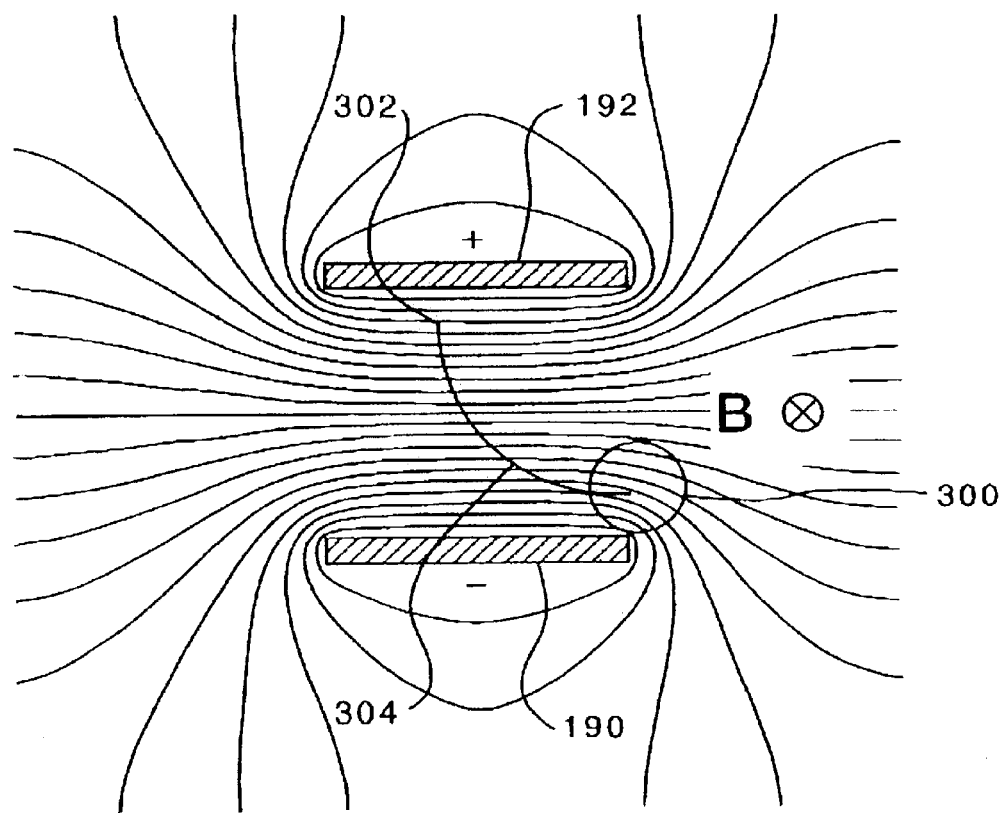
FIG. 5 is a representation of equal potential lines in an electric field generated by a pair of spaced electrodes.

In FIG. 5 the electrodes 190, 192, now with finite dimensions, are connected to a voltage source as marked with +and −. The field generated is presented as equipotential lines. In the circled area 300 the radius of the curvature is increased which corresponds to an increase in field strength. For a group of ions having the same m/z ratio, but different starting energies at the starting point 302 a voltage can be chosen in a way that the ions fly half a cycloid 304 until they reach the physical end of the electrode area.

The simple modeling experiment showed already significantly focusing tendency. Not acceptable was the wrong direction of the field curvature in z-direction (perpendicular to the planes the ion trajectories are located in). This accelerates the ions away from the intended path and they are lost for the detection process.

Starting with the plain capacitor the electrodes' shapes were refined by successive approximation in the simulation process. Replacing the flat plate electrodes by U-shaped electrodes corrected the curvature in z-direction, adding two faceplates to each electrode improved the focusing properties. Eventually all dimensions were varied in steps to find the optimum set. The properties of the field created by these electrodes are discussed hereinafter.

Figure 6:
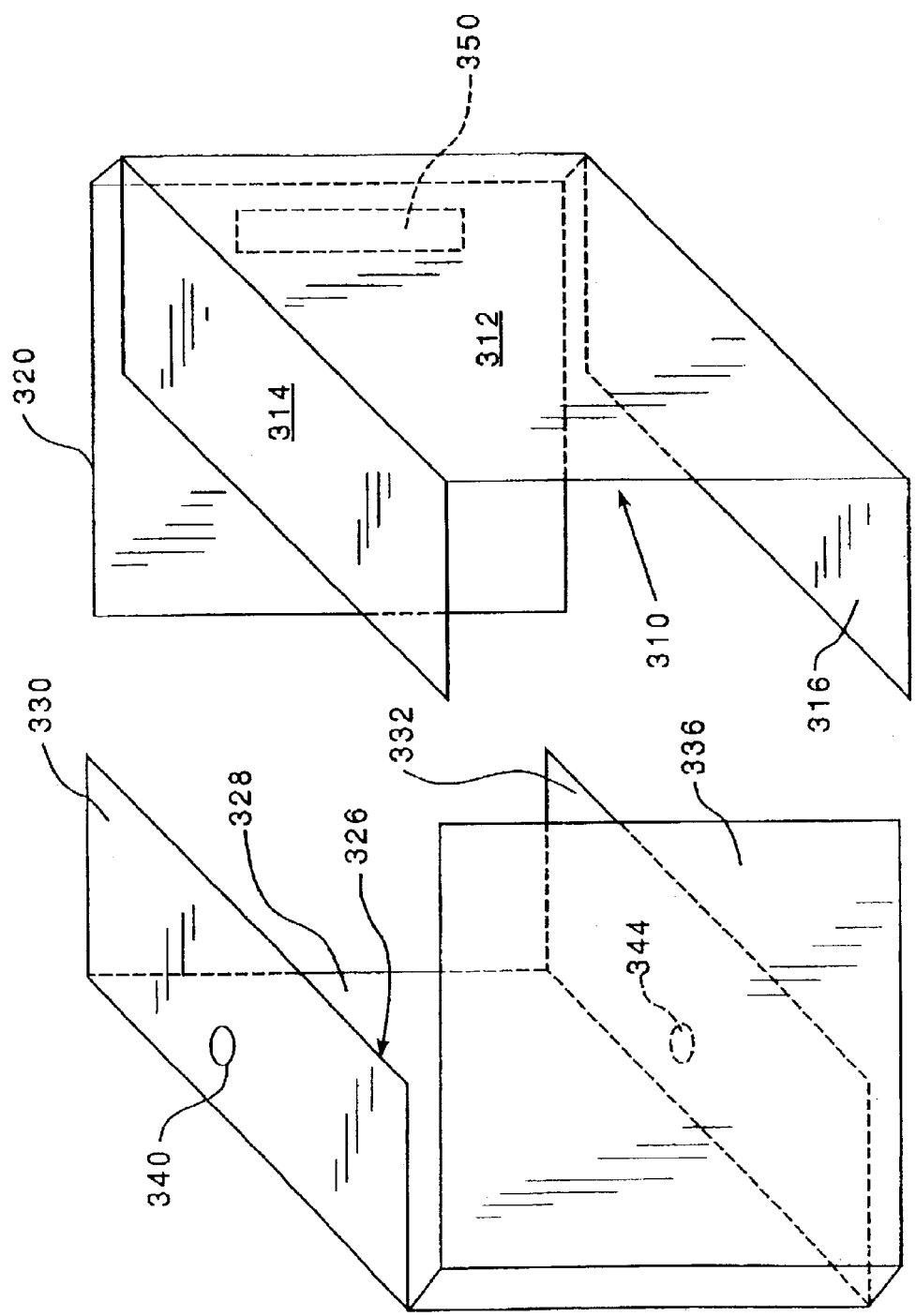
FIG. 6 is a perspective view of a pair of spaced electrodes of the present invention.
Figure 7:
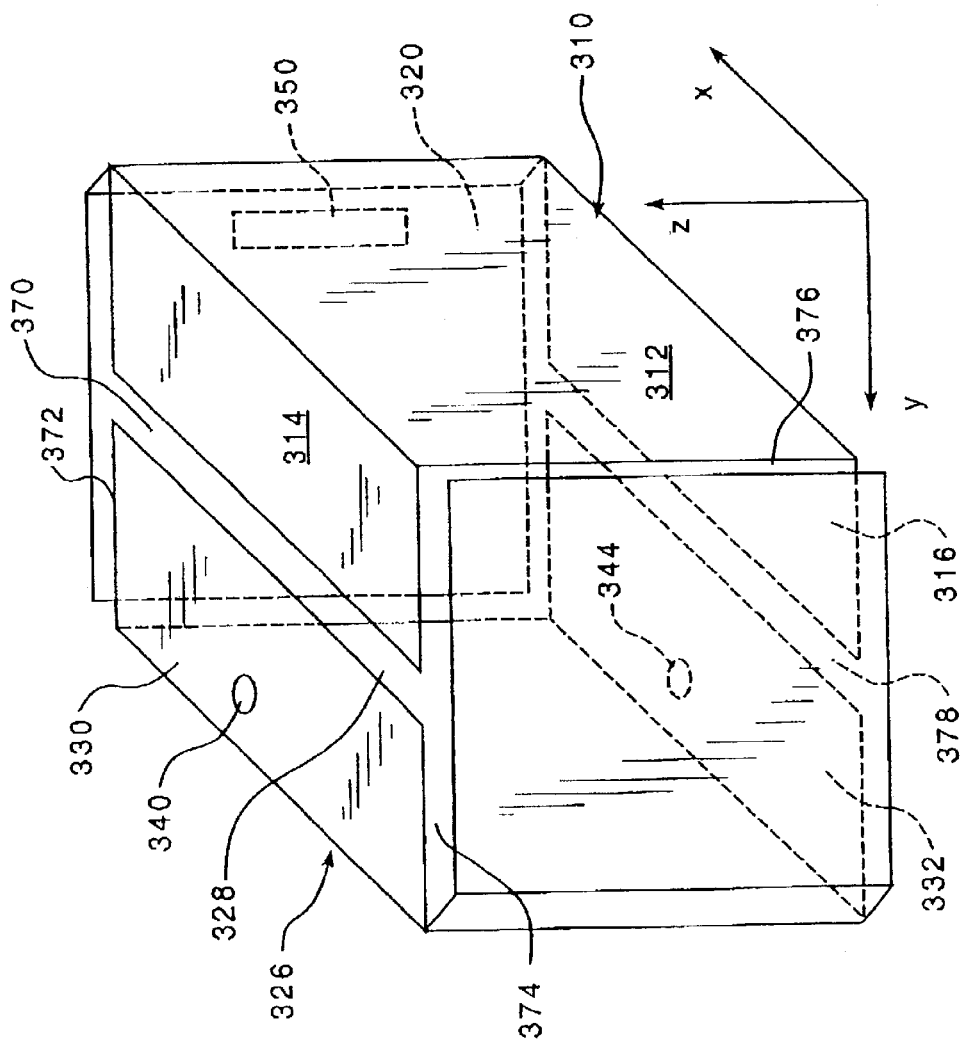
FIG. 7 is a perspective view of the electrodes of FIG. 27 in a relative closed position.

The final shape of a preferred form of the electrodes is seen in FIG. 6. They can be made of sheet metal, made of coated ceramics or machined from bulk metal. The overall structure consists of a first generally U-shaped part 310 having a base 312 and two parallel sidewalls 314, 316, for example, and a faceplate 320, which is connected to the U-shaped part 310. The second generally U-shaped electrode 326 has a base 328 and two parallel sidewalls 330, 332. A faceplate 336 is also connected to generally U-shaped electrode 326. One electrode, 326, has two orifices 340 and 344 that will become entrance and exit apertures for an electron beam to ionize gas molecules or gas atoms. The other electrode, 310, has slit 350 in the faceplate 320 that will become the exit aperture for the ions before they reach the collector. After assembling the electrodes 310 and 326 to a suitable holder with interposed electrical insulation (not shown in the drawings) or which leaves an air gap between electrodes 310, 326 in the final position with respect to each other is shown in FIG. 7. In FIG. 7, the electrodes are insulated, the electrode parts of 310 are separated from the adjacent parts of electrode 326 by small gaps 370, 372, 374, 376, and 378.

In this configuration the electrodes form a cuboid. Typical dimensions of the first prototypes are 14 mm in the x direction, 8 mm in the y-direction, and 7 mm in the z-direction. There is no limited range within which the dimensions have to fit. Another prototype for instance was made with dimensions 7 mm×4 mm×3.5 mm. Because the ratio of each dimension to another one has not changed, the principal function is not affected. The voltage applied to the electrodes has to be decreased by the square of the reduction factor to obtain qualitatively the same analyzer operation. However, in a real application the influence of thermal motion, imperfections in manufacturing, and electromagnetic distortions becomes more serious with decreasing field strength.

Figure 8:
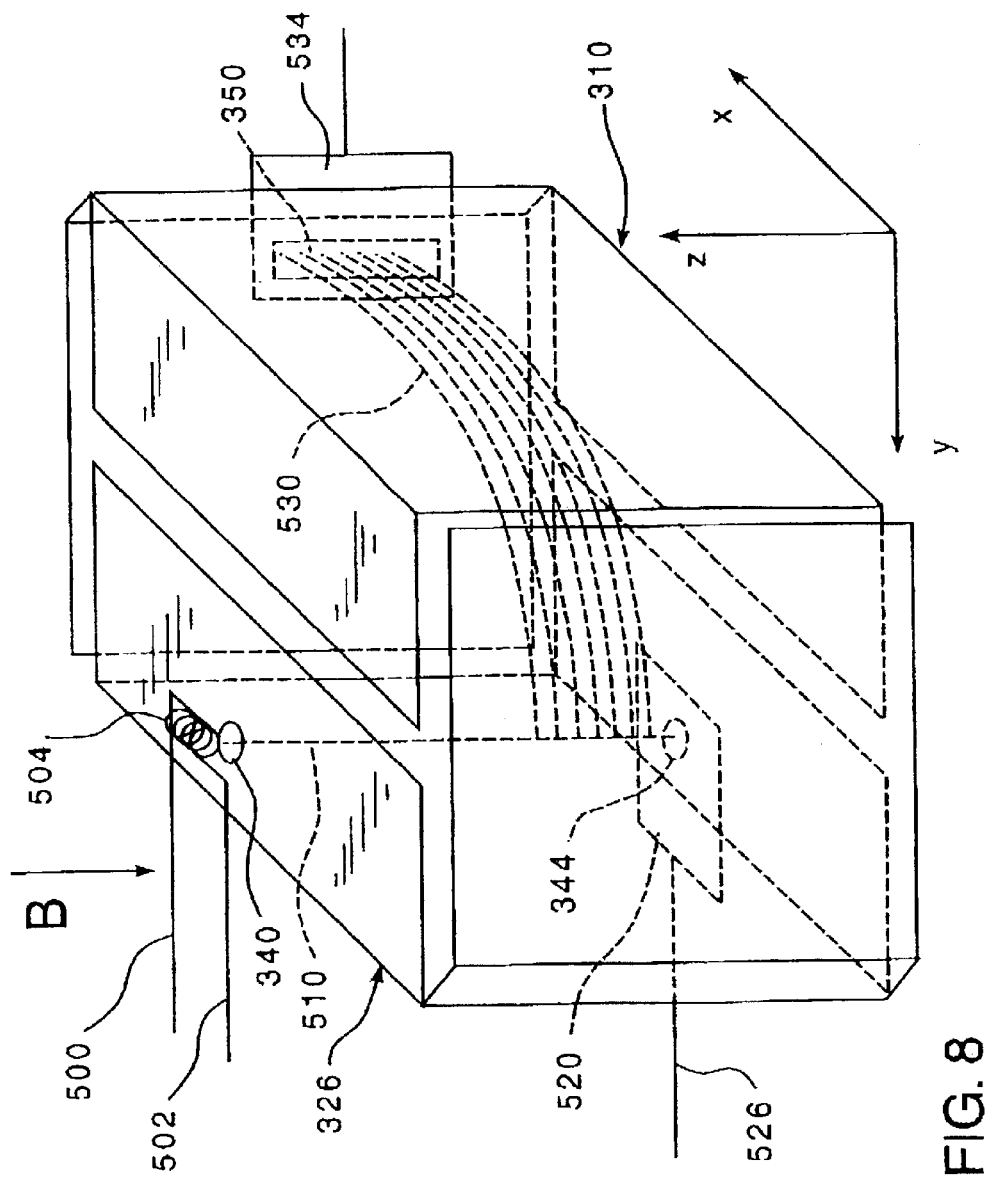
FIG. 8 is a partially schematic representation of an analyzer of the present invention.

The configuration to complete an analyzer is shown in FIG. 8. The magnet and vacuum chamber which are well known to those skilled in the art are not shown in this drawing. The way to ionize the gas molecules has no influence on the separator. However, this analyzer is particularly suitable for electron impact ionization. A current source (not shown) connected to the filament terminals 500, 502 heats the filament 504, which then emits electrons by thermal emission. Provided the potential of the filament 504, relative to the electrode, is negative the electrons are accelerated to the entrance aperture 340. The electron beam 510 created remains narrow while crossing the inner volume of the cuboid because the electrons fly parallel to the magnetic field lines. The electron beam 510 exits through the aperture 344 and impinges on the anode 520, which is connected by its terminal 526 to a potential, which is positive compared to the electrode 326 (not shown).

If the potential difference between the filament 504 and the electrode 326 is larger than the ionization energy for an atom or a molecule ionization takes place. The commonly used ionization energy is 70 eV where most gases show a maximum in ionization efficiency.

Ions created by the electron beam fly on trajectories 530, which are alike, half a cycloid. The ions fly along a mathematically correct cycloid if the electric and magnetic fields are uniform and perpendicular to each other. If the m/z ratio of the ions matches the conditions provided by the applied fields the ions are focused into the exit slit 350 and impinge on the collector 534 which will responsively emit a signal to an associated microprocessor (not shown). Ions with lower or higher m/z ratio miss the slit.

Figure 9:
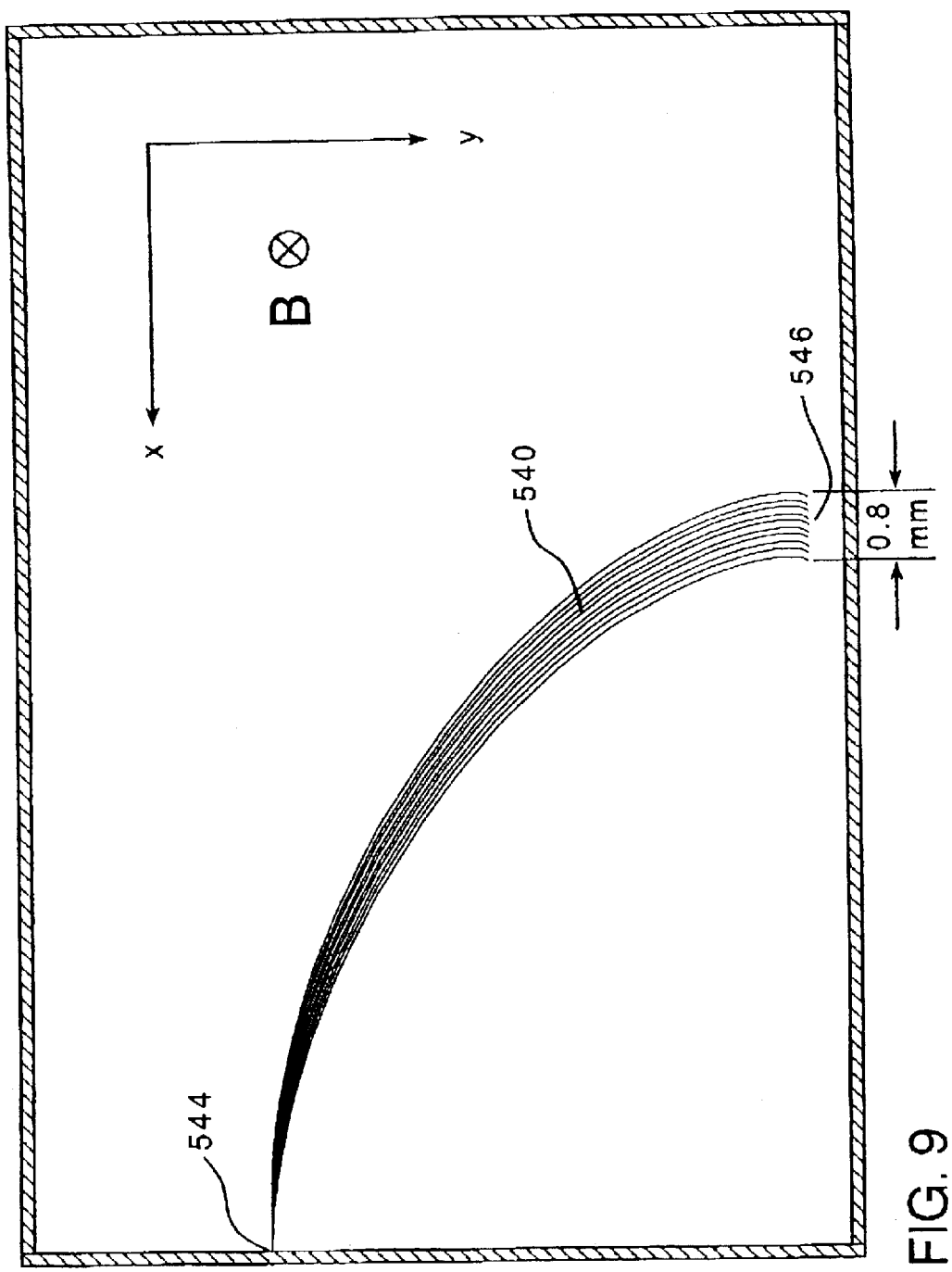
FIGS. 9 through 11, respectively, show the analyzer with the ion starting point varied in the x-position (FIG. 9), the y-position (FIG. 10), and the z-position (FIG. 11).
Figure 10:
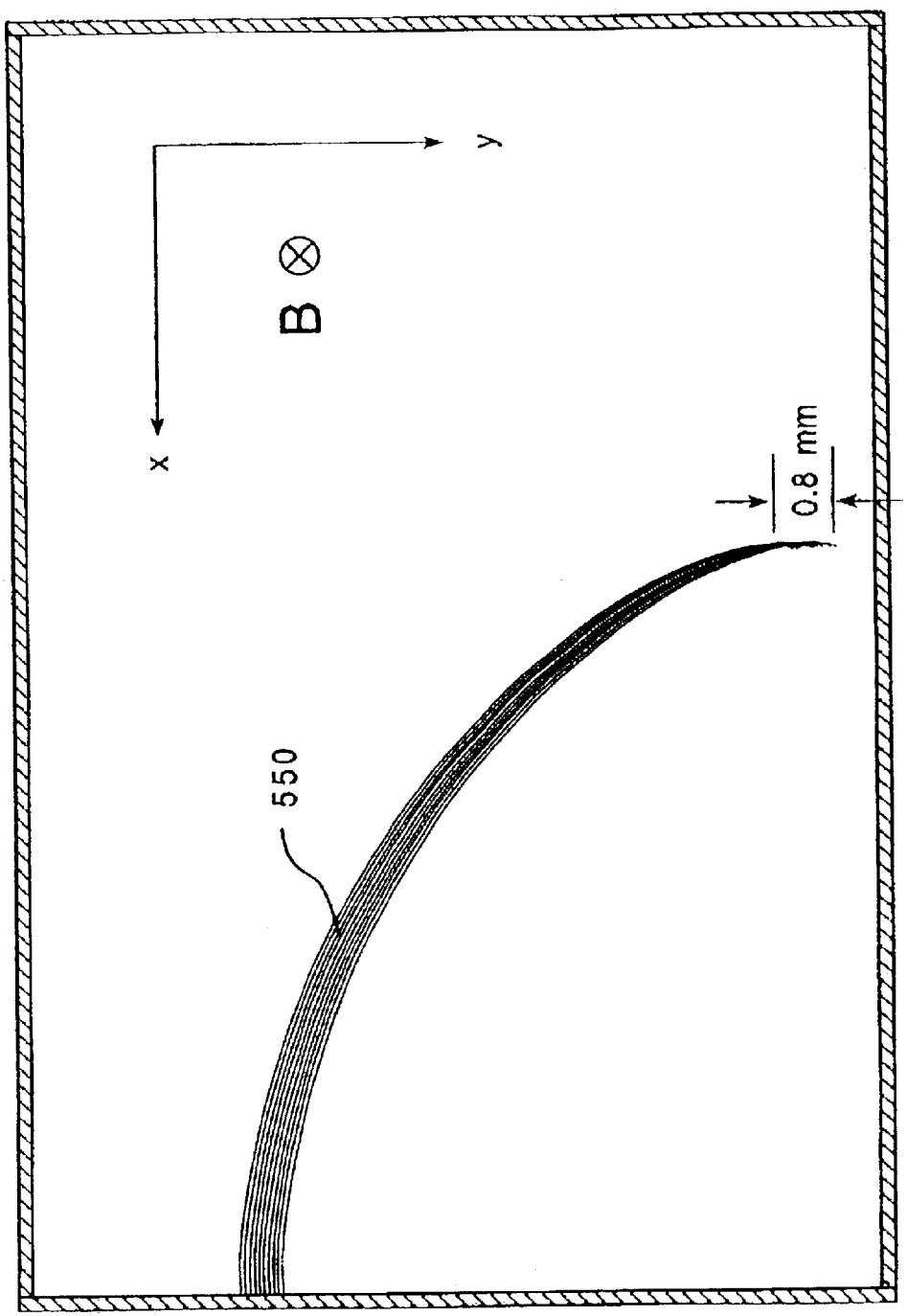
Figure 11:
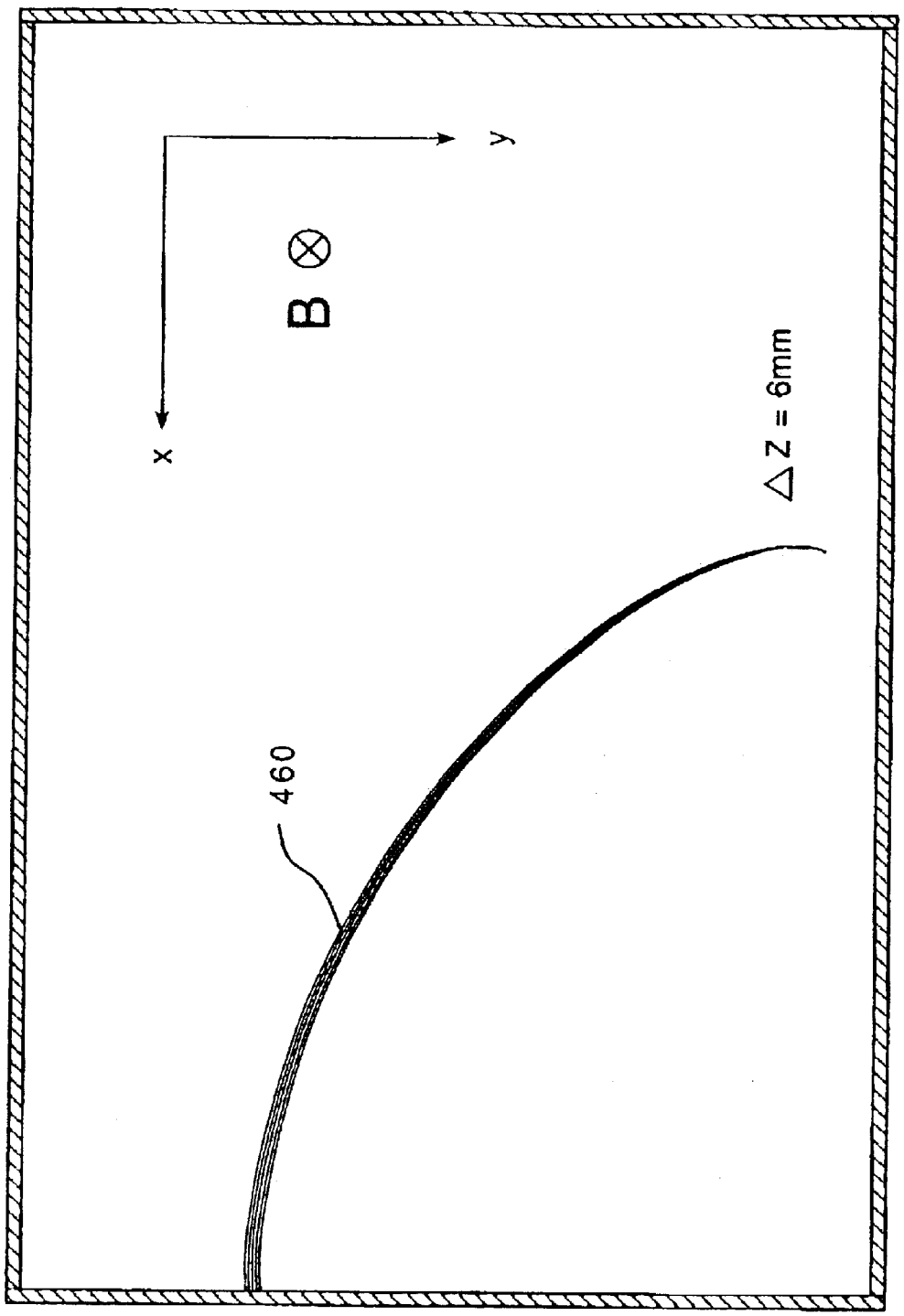

The ionizer, as described, does not have a physical aperture to release the ions. Instead the whole area where ions are created—this is the volume of the electron beam inside the electrodes—contributes to the ion beam leaving the ion source. Imaging properties of the electric field reduce the influence of the beam's diameter on the resolving power. This is shown in FIGS. 9 through 13, which show simulations for the analyzer shown in FIG. 8 with the dimensions 14 mm (x), 7 mm (y) and 4 mm (z). For 10 ions with m/z=4 the starting point is varied in x-position (FIG. 9), y-position (FIG. 10), and z-position (FIG. 11). In FIG. 9 the ion trajectories 540 converge to a point 544, in FIG. 10 with ion trajectories the initial spread in y is reduced by about 30%, FIG. 11 shows that the influence of the distribution of the trajectories in z is minimal.

Figure 12:
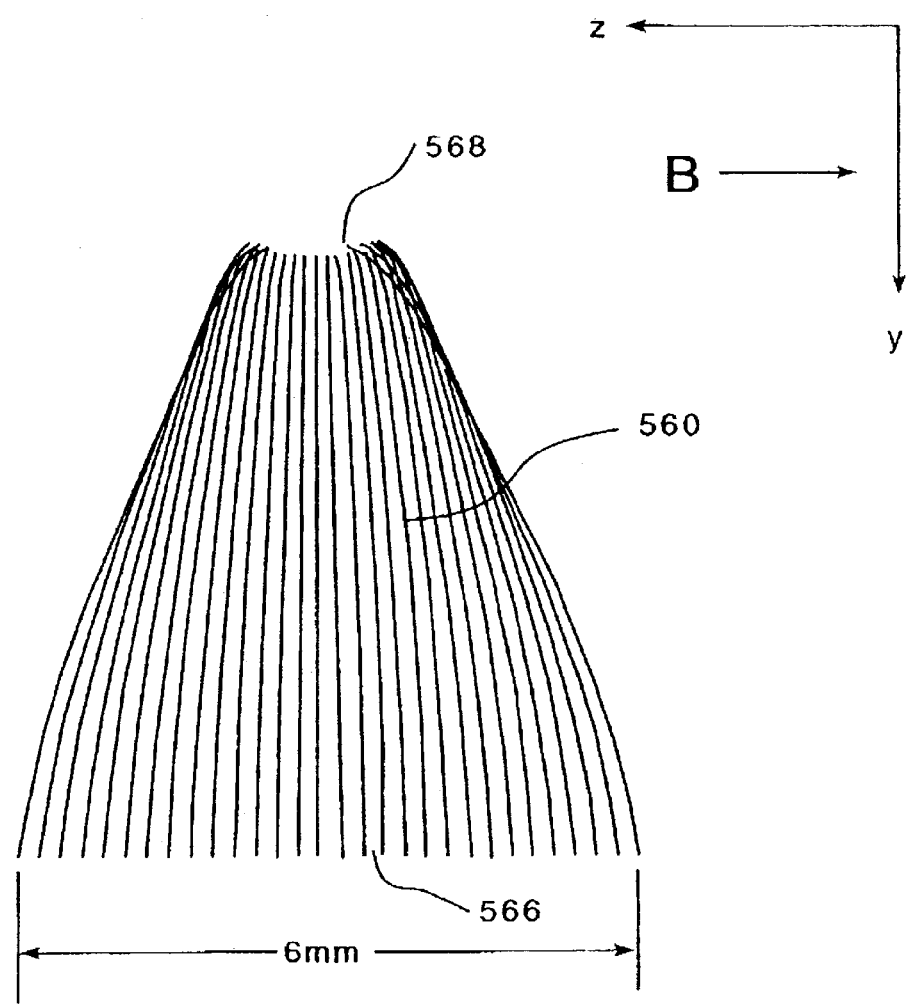
FIG. 12 illustrates the confinement capabilities in the z-direction.

FIG. 12 demonstrates the confinement capabilities in z-direction. The drawing shows the projection of the ion beam 560 from FIG. 11 into the y-z-plane. 30 ions starting from different locations 566 are deflected to the x-y-plane in the center of the analyzer before they reach the collector slit position 568.

Figure 13:
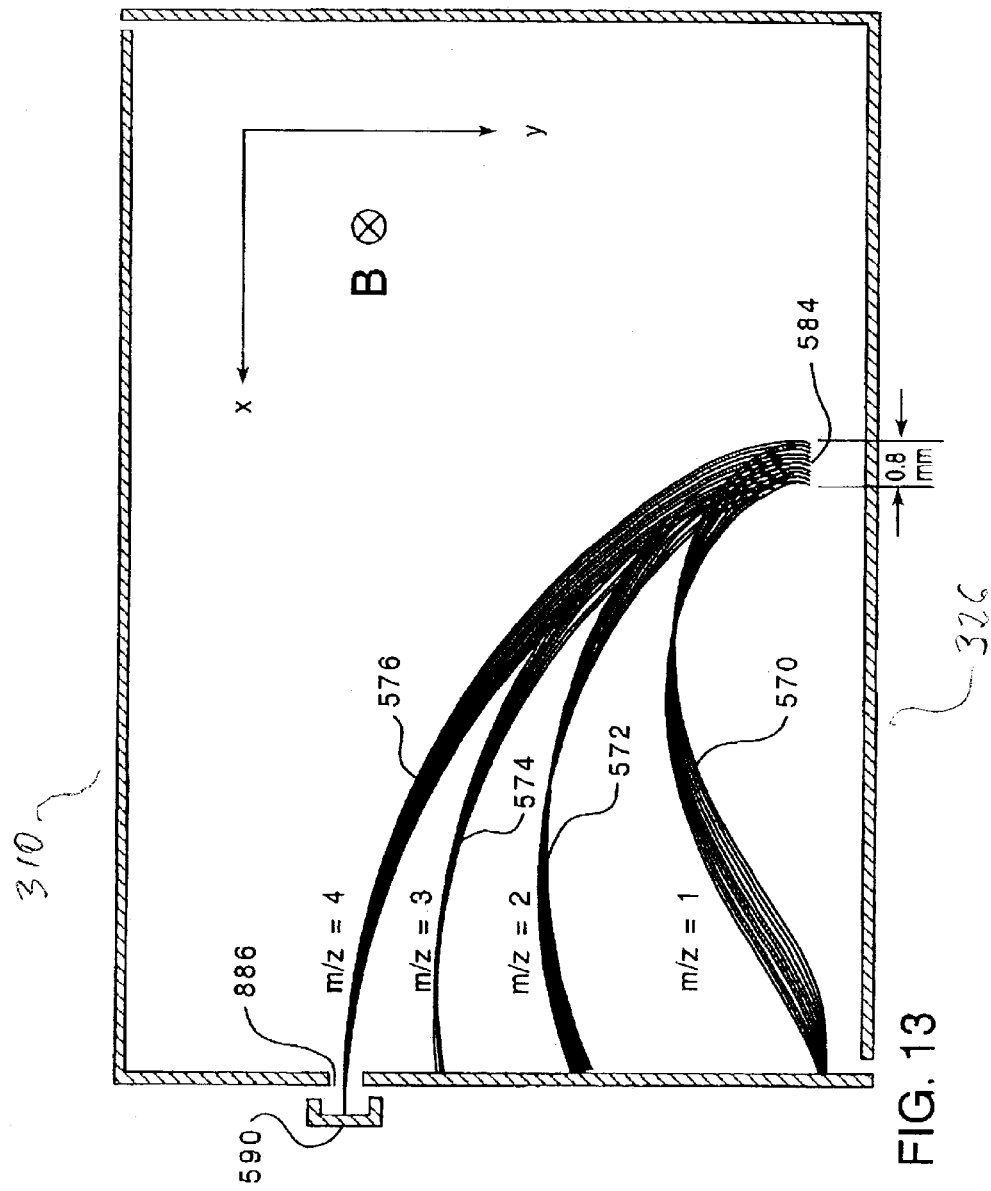
FIG. 13 illustrates a cross-section of the analyzer with ion beams of four different low mass to charge ratios.

In FIG. 13 the separation characteristic for low m/z ratios is simulated. Four ion beams 570, 572, 574, 576 with m/z ratios 1 through 4 start at an area 584. For a certain voltage applied to the electrodes 310, 326 (FIG. 8) only ions with the appropriate m/z ratio—in FIG. 13 ions with m/z=4—can penetrate the collector slit 586 and impinge on the collector 590.

Figure 14:
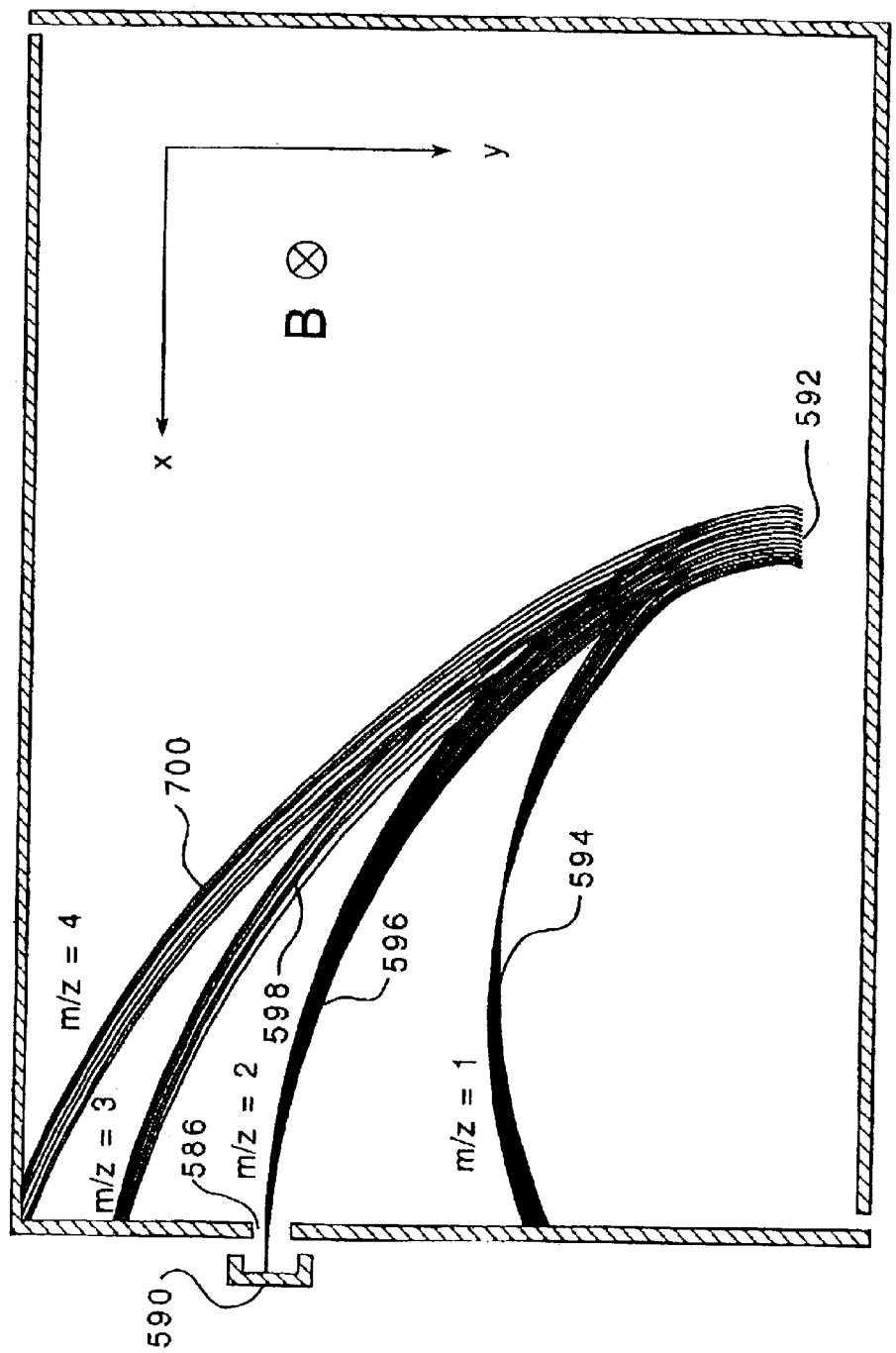
FIG. 14 is similar to FIG. 13, but shows the trajectories for the voltage being doubled in FIG. 14 as compared with FIG. 13.

The analyzer can be tuned to other m/z ratios by using the fact that the reciprocal m/z ratios z/m are proportional to the voltages needed to hit the collector slit. Doubling the voltage that tuned the analyzer to m/z=4 in FIG. 13 tunes the system to m/z=2, which is shown in FIG. 14 starting at 592 and having trajectories 594, 596, 598, 700.

Figure 15:
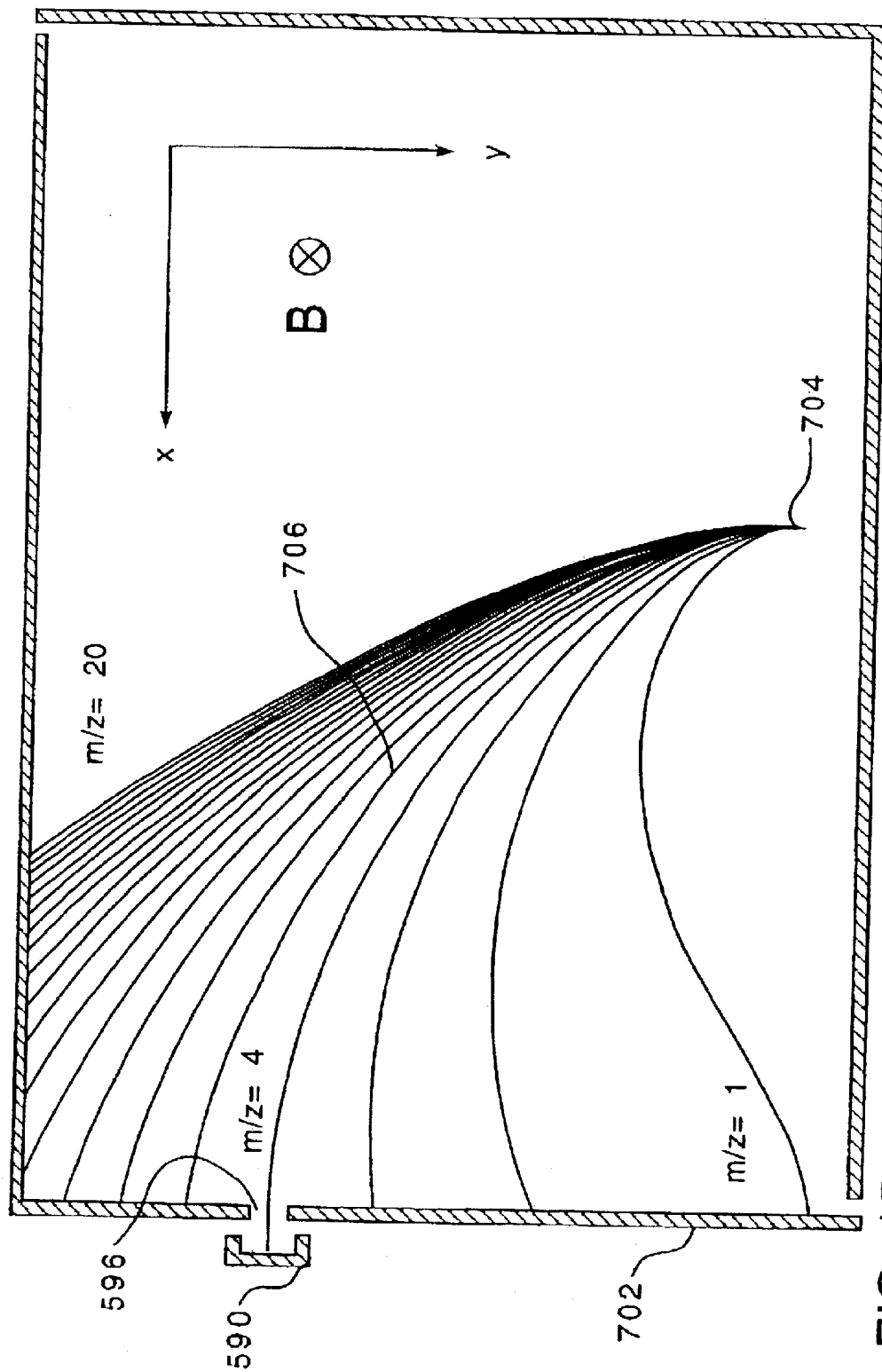
FIG. 15 shows a plot of trajectories for twenty ions having different mass to charge ratios.

The trajectories of 20 ions from m/z=1 to 20 are plotted in FIG. 15 from 704 through 706. The analyzer is tuned to m/z=4. It can be seen that the separation in the plane 702 is no longer a linear function of the m/z ratio. The field profile widens the spread at the lower m/z scale.

Figure 16:
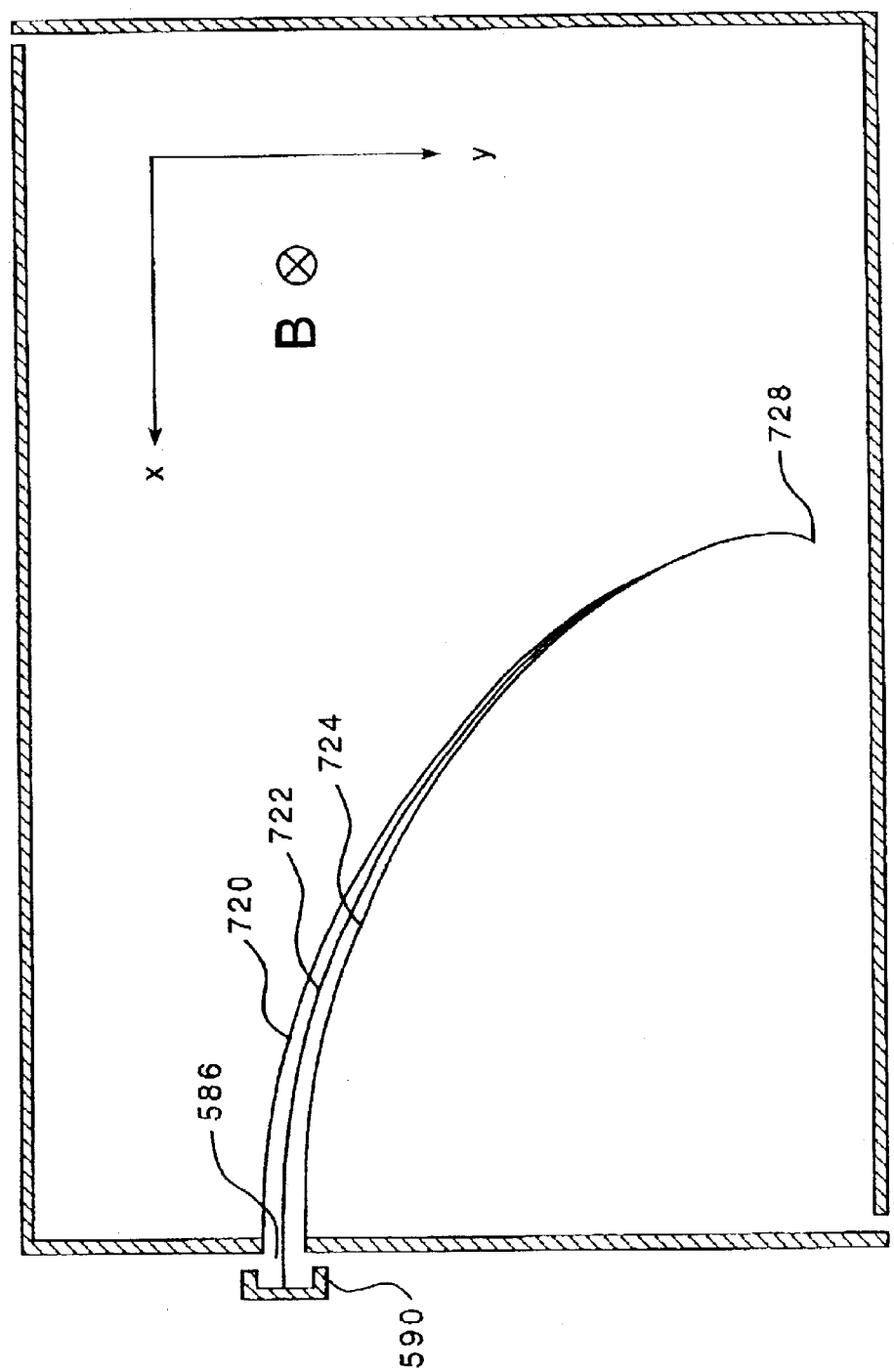
FIG. 16 illustrates a group of trajectories of ions starting at the same point and having different mass to charge ratios.

For this analyzer with the dimensions listed above and a collector slit width of 5 mm the usable mass range ends by m/z=18, which is shown in FIG. 16. The ions 720, 722 and 724 with m/z ratios 17, 18, and 19 start at the same point 728. If the ionizer is tuned to m/z=17 as shown in this simulated plot and the ion with m/z=17 exits through the middle of the collector slit 586, the ions with m/z=16 and m/z=18 cannot reach the collector 590.

Figure 17:
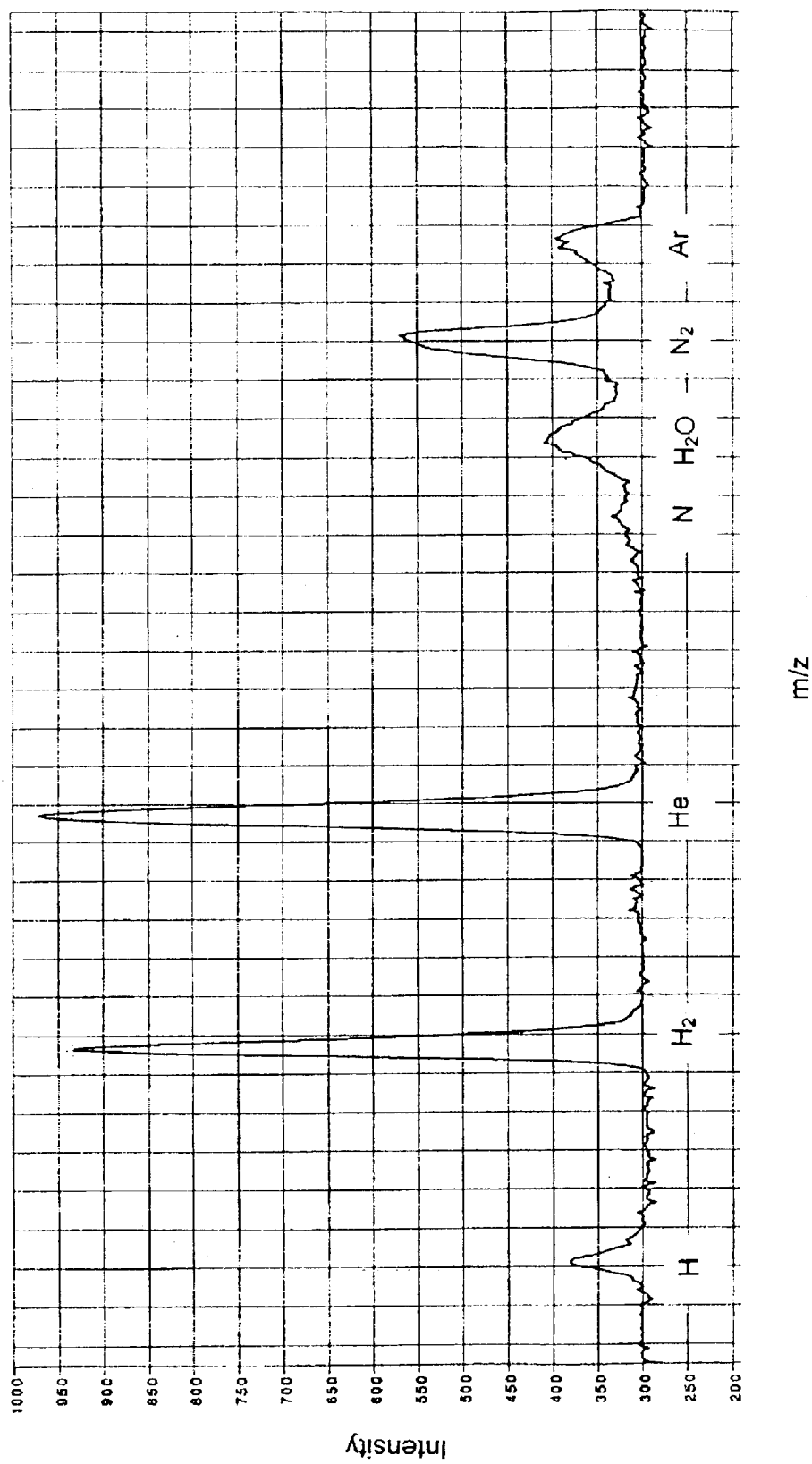
FIG. 17 shows a plot of intensity versus mass to charge ratio of a test gas mixture as measured by an analyzer of the present invention.
Figure 18A:
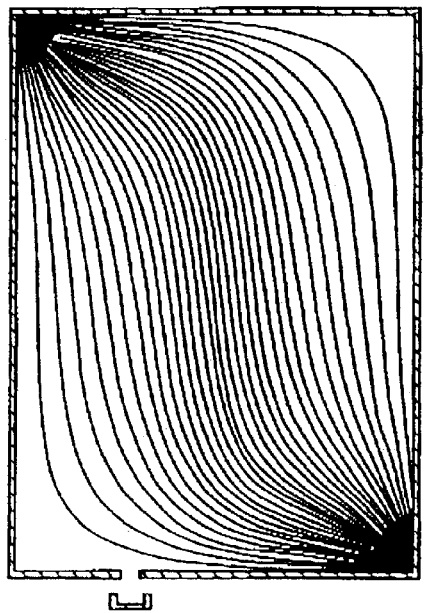
FIGS. 18(a) and (b) show, respectively, equipotential lines in a virtual plane taken through the analyzer.
Figure 18B:
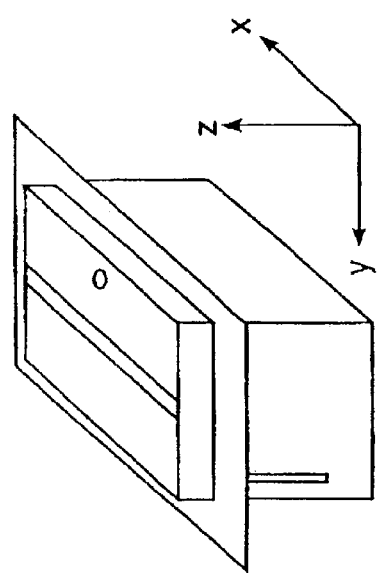
FIGS. 18(c)(d) and 18(e)(f) show, respectively such equipotential lines for virtual planes positioned at different levels.
Figure 18C:
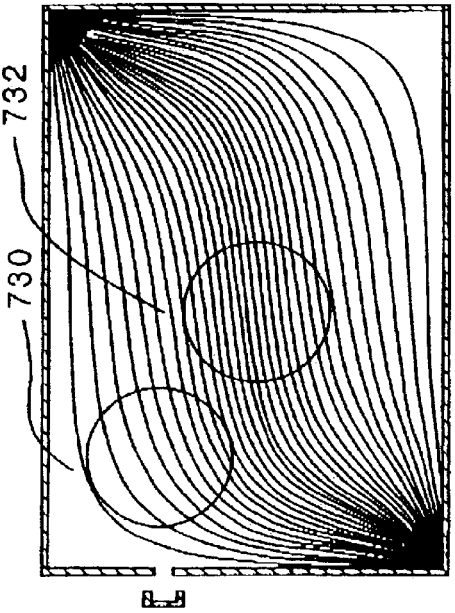
Figure 18D:
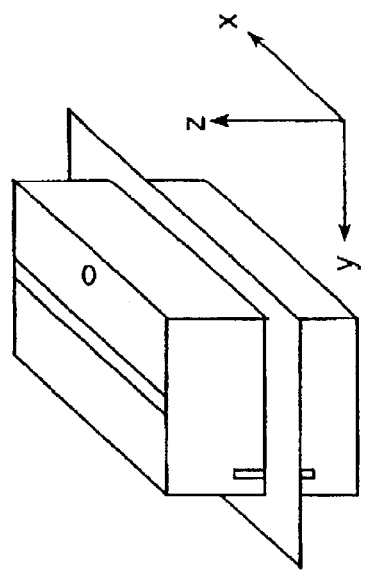
Figure 18F:
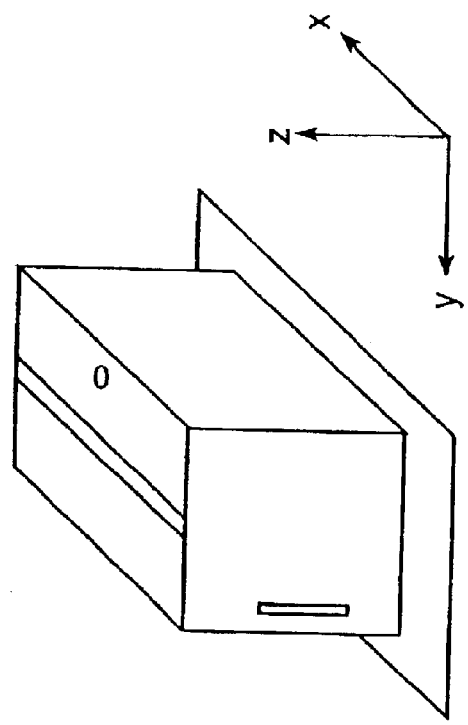
Figure 18E:
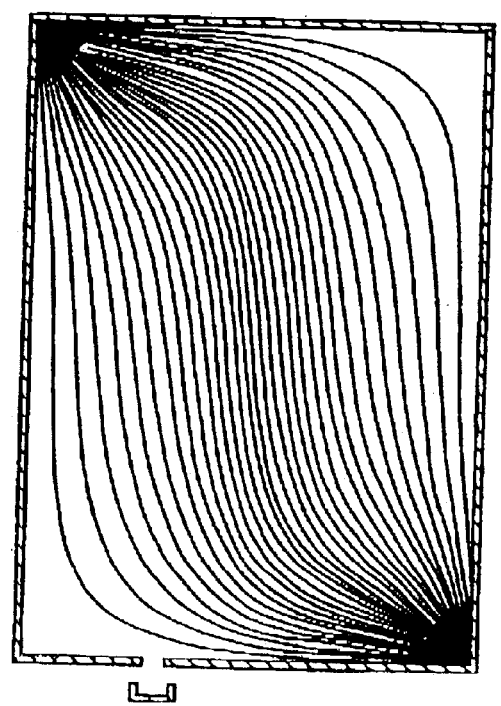
Figure 19B:
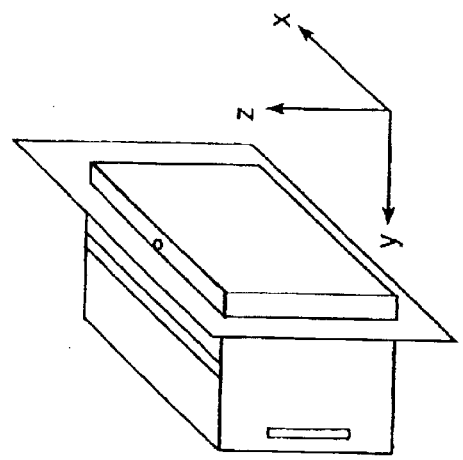
FIGS. 19(a)(b) show equipotential lines taken at a first virtual plane location and FIGS. 19(c)(d) and FIGS. 19(e)(f) show, respectively, equipotential lines taken at the shown virtual plane position.
Figure 19D:
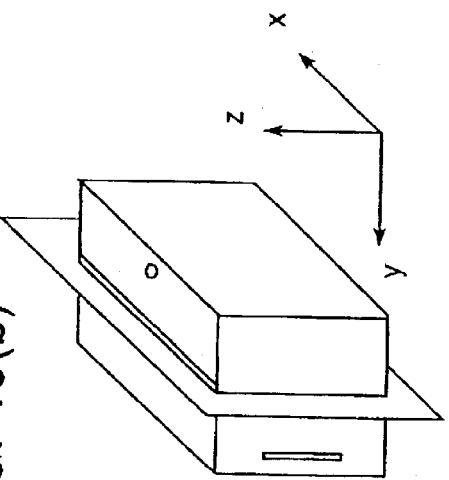
Figure 19A:
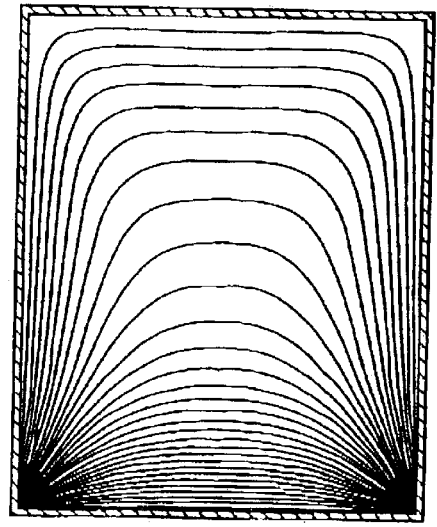
Figure 19C:
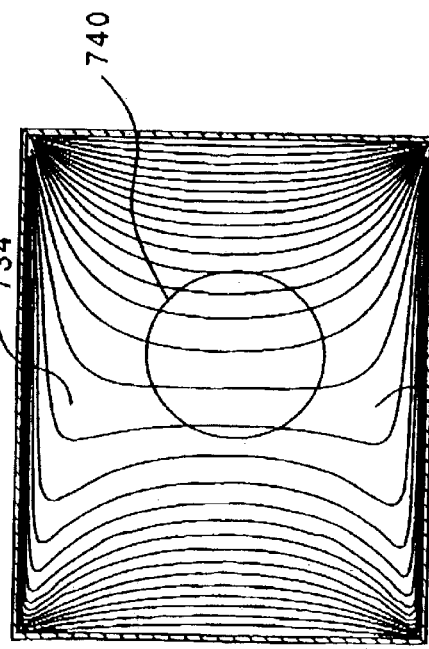
Figure 19F:
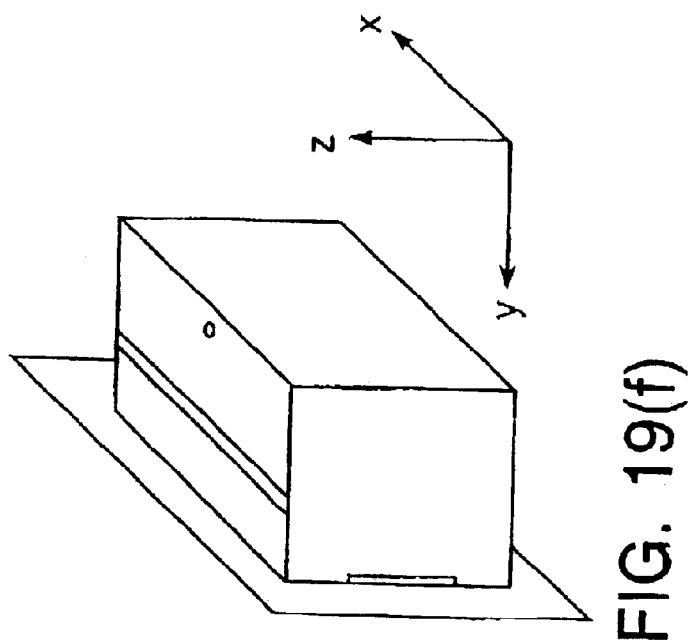
Figure 19E:
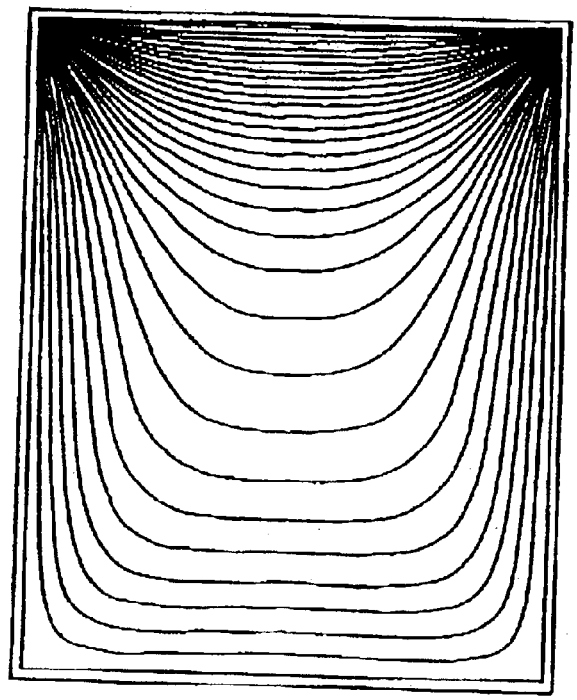

FIG. 17 shows a mass spectrum 4m/z=1 amu to m/z=40 amu for a test gas mixture containing hydrogen, helium, oxygen, nitrogen and argon. At low m/z ratios the analyzer provides sufficient resolving power to use it for hydrogen analyzers or helium leak detectors, for example.

FIGS. 18(a)-(f), 19(a)-(f) and 20(a)-(f) show equipotential lines in different planes inside the analyzer. The figures to the right of the potential diagram indicates where the virtual planes are located.

From FIG. 18 we conclude that the field 730 around the center approaches in a rough approximation a uniform field which explains the similarity of the trajectories shown before with cycloids. The increase in curvature in the vicinity of the collector 732 is introduced to compensate the loss of energy focusing.

FIG. 19 suggests that ions starting at extreme z positions 734, 736 will experience a strongly spoiled electric field. The trajectories presented above are obtained when the ions starting positions are located in a restricted central area 740 where the field approximates the uniform structure.

Figure 20B:
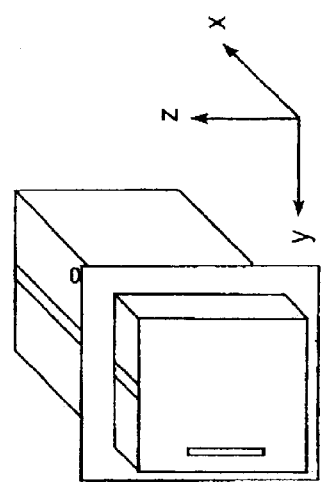
FIGS. 20(a),(b),(c),(d),(e),(f) show, respectively, the analyzer with virtual cutting planes at three locations and the corresponding equipotential lines of the electric field.
Figure 20D:
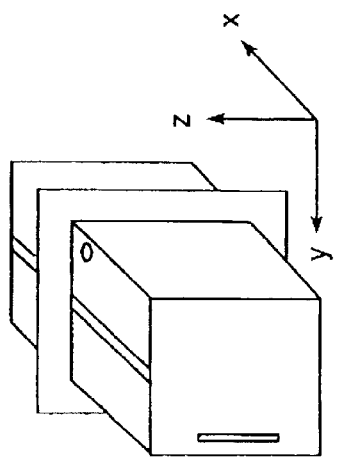
Figure 20A:
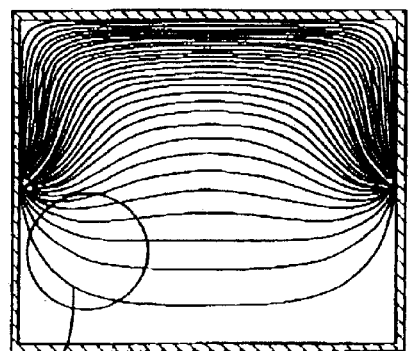
Figure 20C:
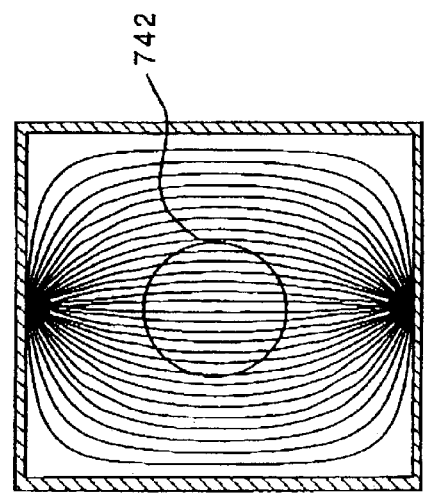
Figure 20F:
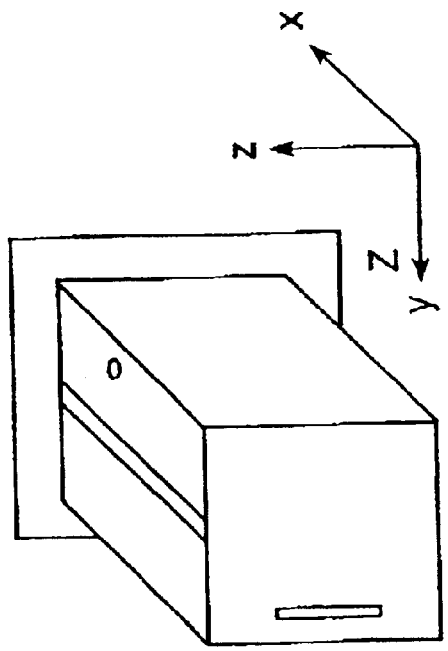
Figure 20E:
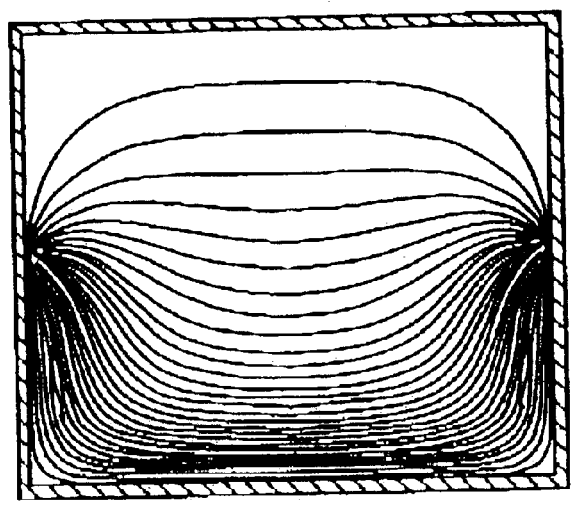

The area 742 in FIG. 20(c) confirms that the electric field near the center approaches uniformity. For the confining properties to be seen in FIG. 20(a) the potential is curved as shown by the circle 744 in FIG. 20(a).

Because of its simple structure and the small physical dimensions the analyzer described herein can act as a low cost, but high performance ion source to introduce ions into a mass spectrometer. The same arrangement without the collector provides all capabilities for an ion source. If it is tuned properly to the m/z position the mass spectrometer is tuned at, its mass selectivity holds back most of the unwanted ions from the mass spectrometer's analyzer. This improves the resolving power with any mass spectrometer. In connection with a quadrupole filter the zero blast can be suppressed efficiently.

Another advantage of the cuboid design is the chance to use it as a closed ion source. Closed ion sources are connected to the analyzer's vacuum with low molecular flow conductance. As a result, the pressure in the ion source can be higher than in the analyzer which increases the sensitivity. For this purpose the gaps shown in FIG. 8 should be very narrow or even sealed with an insulator. The gaseous sample then can be introduced by a thin tube at nearly any position of the electrodes.

It will be appreciated that in the embodiment of FIGS. 1 through 20 the miniaturized mass spectrometer or analyzer or ionizer provides an effective means employing mass to charge ratio as controlled by adjusting the electric field in the presence of a magnetic field to determine what mass charge to ratio ion beam will be emitted or permitted to exit through the exit opening and which will not. Among numerous uses of this separation apparatus and method are in leak detection as, for example, in helium or hydrogen uses. Further, the system is designed to function effectively with partial cycloid ion beams. It is particularly suited to making determination with respect to materials having low mass such as, for example, on the order of 20 amu or less. All of this can be accomplished while employing a very small housing.

Whereas particular embodiments have been described hereinabove, for purposes of illustration, it will be evident to those skilled in the art that numerous variations of the details may be made without departing from the invention as defined in the appended claims.

What is claimed is:

1. A mass spectrometer comprising
   a first generally planar electrode,
   a second generally planar electrode disposed generally parallel to and spaced from said first electrode,
   said first and second electrodes structured to create an electric field therebetween,
   a magnetic field generator structured to create a magnetic field oriented generally perpendicular to said electric field,
   said first and second electrodes each having a base and walls projecting generally toward the other to cooperate in defining an ion generating chamber,
   an ion exit permitting certain ions to exit said chamber, and
   an ion collector disposed exteriorly of and adjacent to said ion exit for receiving said ions passing therethrough.

2. The mass spectrometer of claim 1 including said walls of each said of the first electrode and second electrode having a pair of generally parallel upper and lower walls and an endwall.

3. The mass spectrometer of claim 1 including
   said first electrode being electrically insulated from said second electrode.

4. The mass spectrometer of claim 3 including
   said first electrode and second electrode having insulating air gaps therebetween.

5. The mass spectrometer of claim 3 including an electrically insulating material interposed between said first and second electrodes.

6. The mass spectrometer of claim 1 including
   said mass spectrometer being structured to process low molecular weight ions.

7. The mass spectrometer of claim 6 including
   said low molecular weight ions having a molecular weight less than 20 amu.

8. The mass spectrometer of claim 1 including
   said mass spectrometer being structured to process ion beams which are partial cycloids.

9. The mass spectrometer of claim 1 including
   said first electrode and second electrode cooperating to define a said ion generating chamber which has a length of about 7–14 mm, a width which is about 4–8 mm and a height which is about 3.5–7 mm.

10. The mass spectrometer of claim 1 including
    said mass spectrometer being structured to function as a leak detector.

11. The mass spectrometer of claim 1 including
    said mass spectrometer being structured to detect a gas selected from the group consisting of helium and hydrogen.

12. The mass spectrometer of claim 1 including
    said ion beam being generated by electron impact ionization.

13. An ionizer comprising
    a first generally planar electrode,
    a second generally planar electrode disposed generally parallel to and spaced from said first electrode,
    said first and second electrodes structured to create an electric field therebetween,
    a magnetic field generator structured to create a magnetic field oriented generally perpendicular to said electric field,
    said first and second electrodes each having a base and walls projecting generally toward the other to cooperate in defining an ion generating chamber, and
    an ion exit permitting certain ions to exit said chamber.

14. The ionizer of claim 13 including
    said walls of each said of the first electrode and second electrode having a pair of generally parallel upper and lower walls and an endwall.

15. The ionizer of claim 13 including
    said first electrode being electrically insulated from said second electrode.

16. The ionizer of claim 15 including said electrically insulated first electrode and second electrode having air gaps therebetween.

17. The ionizer of claim 15 including
    an electrically insulating material interposed between said first and second electrodes.

18. The ionizer of claim 13 including
    said mass spectrometer being structured to process low molecular weight ions.

19. The ionizer of claim 18 including
    said low molecular weight ions having a molecular weight less than 20 amu.

20. The ionizer of claim 13 including
    said mass spectrometer being structured to process ion beams which are partial cycloids.

21. The ionizer of claim 13 including
    said first electrode and second electrode cooperating to define a said ion generating chamber which has a length of about 7–14 mm, a width which is about 4–8 mm and a height which is about 3.5–7 mm.

22. The ionizer of claim 13 including
    said mass spectrometer being structured to function as a leak detector.

23. The ionizer of claim 13 including
    said mass spectrometer being structured to detect a gas selected from the group consisting of helium and hydrogen.

24. The ionizer of claim 13 including
    said ion beam being generated by electron impact ionization.

25. A method of analyzing a gas comprising
    providing first and second generally planar electrodes which are oriented generally parallel to and spaced from each other with walls projecting therefrom to define an ion generating chamber,
    imposing an electric field on said chamber,
    imposing a magnetic field oriented generally perpendicular to said electric field on said chamber,
    establishing separation of a plurality of ions according to mass to charge ratio, and
    causing certain of said ions to exit said chamber on the basis of mass to charge ratio.

26. The method of claim 25 including
    employing said method on low mass ions.

27. The method of claim 26 including employing said method on ions having a mass less than 20 amu.

28. The method of claim 25 including effecting said paths of said ion beams based on mass to charge ratio of said ions by adjusting said electric field.

29. The method of claim 25 including effecting said exit of ions of predetermined mass to charge ratio on the basis of a partial cycloid ion beam path.

30. The method of claim 25 including employing said ion generating chamber having a length of about 7–14 mm, a width of about 4–8 mm and a height of about 3.5–7 mm.

31. A method of generating ions comprising providing first and second generally planar electrodes which are oriented generally parallel to and spaced from each other with walls projecting therefrom to define an ion generating chamber, imposing an electric field on said chamber, imposing a magnetic field oriented generally perpendicular to said electric field on said chamber, establishing separation of said ions according to mass to charge ratio, and causing certain ions to exit said chamber on the basis of mass to charge ratio.

32. The method of claim 31 including employing said method on low mass ions.

33. The method of claim 32 including employing said method on ions having a mass less than 20 amu.

34. The method of claim 31 including effecting said paths of said ion beams based on mass to charge ratio of said ions by adjusting said electric field.

35. The method of claim 31 including effecting said exit of ions of predetermined mass to charge ratio on the basis of a partial cycloid ion beam path.

36. The method of claim 31 including employing said ion generating chamber having a length of about 7–14 mm, a width of about 4–8 mm and a height of about 3.5–7 mm.

* * * * *

UNITED STATES PATENT AND TRADEMARK OFFICE
CERTIFICATE OF CORRECTION

PATENT NO. : 6,815,674 B1
DATED : November 9, 2004
INVENTOR(S) : Guenter F. Voss It is certified that error appears in the above-identified patent and that said Letters Patent is hereby corrected as shown below:

Column 5,
Line 44, "starling" should read -- starting --.

Signed and Sealed this

First Day of March, 2005

JON W. DUDAS
*Director of the United States Patent and Trademark Office*